(12) United States Patent
Buehler et al.

(10) Patent No.: US 11,628,865 B2
(45) Date of Patent: Apr. 18, 2023

(54) METHOD AND SYSTEM FOR BEHAVIORAL CLONING OF AUTONOMOUS DRIVING POLICIES FOR SAFE AUTONOMOUS AGENTS

(71) Applicant: TOYOTA RESEARCH INSTITUTE, INC., Los Altos, CA (US)

(72) Inventors: Andreas Buehler, Mauren (LI); Adrien David Gaidon, Mountain View, CA (US); Rares A. Ambrus, San Francisco, CA (US); Guy Rosman, Newton, MA (US); Wolfram Burgard, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 316 days.

(21) Appl. No.: 17/000,128

(22) Filed: Aug. 21, 2020

(65) Prior Publication Data
US 2022/0055663 A1 Feb. 24, 2022

(51) Int. Cl.
*B60W 60/00* (2020.01)
*B60W 30/18* (2012.01)
(Continued)

(52) U.S. Cl.
CPC ........ *B60W 60/0027* (2020.02); *B60W 10/20* (2013.01); *B60W 30/18154* (2013.01); *G06N 3/08* (2013.01); *G06V 20/584* (2022.01); *B60W 2554/4041* (2020.02); *B60W 2554/4046* (2020.02); *B60W 2554/80* (2020.02)

(58) Field of Classification Search
CPC ............ B60W 60/0027; B60W 10/20; B60W 30/18154; B60W 2554/4041; B60W 2554/80; B60W 2554/4046; G06V 20/584; G06N 3/08
See application file for complete search history.

(56) References Cited

U.S. PATENT DOCUMENTS 11,110,941 B2 * 9/2021 Wray .................. B60W 60/001
2019/0369637 A1 * 12/2019 Shalev-Shwartz ... G05D 1/0251
2022/0055689 A1 * 2/2022 Mandlekar ......... B62D 15/0285

OTHER PUBLICATIONS

A. Kuefler, J. Morton, T. Wheeler and M. Kochenderfer, "Imitating driver behavior with generative adversarial networks," 2017 IEEE Intelligent Vehicles Symposium (IV), 2017, pp. 204-211, doi: 10.1109/IVS.2017.7995721. (Year: 2017).*

(Continued)

*Primary Examiner* — Gertrude Arthur Jeanglaude
*Assistant Examiner* — Brittany Renee Peko
(74) *Attorney, Agent, or Firm* — Seyfarth Shaw LLP

(57) ABSTRACT

A method for behavior cloned vehicle trajectory planning is described. The method includes perceiving vehicles proximate an ego vehicle in a driving environment, including a scalar confidence value of each perceived vehicle. The method also includes generating a bird's-eye-view (BEV) grid showing the ego vehicle and each perceived vehicle based on each of the scalar confidence values. The method further includes ignoring at least one of the perceived vehicles when the scalar confidence value of the at least one of the perceived vehicles is less than a predetermined value. The method also includes selecting an ego vehicle trajectory based on a cloned expert vehicle behavior policy according to remaining perceived vehicles.

18 Claims, 7 Drawing Sheets

(51) Int. Cl.
    *B60W 10/20*     (2006.01)
    *G06N 3/08*     (2023.01)
    *G06V 20/58*     (2022.01)

(56) References Cited

OTHER PUBLICATIONS

J. Wang, M. Zhu, D. Sun, B. Wang, W. Gao and H. Wei, "MCF3D: Multi-Stage Complementary Fusion for Multi-Sensor 3D Object Detection," in IEEE Access, vol. 7, pp. 90801-90814, 2019, doi: 10.1109/ACCESS.2019.2927012. (Year: 2019).*

H. Cui, "Multimodal Trajectory Predictions for Autonomous Driving using Deep Convolutional Networks," 2018 (Year: 2018).*

Amini, et al., "Variational Autoencoder for End-to-End Control of Autonomous Driving with Novelty Detection and Training De-Biasing," IEEE/RSJ International Conference on Intelligent Robots and Systems (IROS), Palacio Municipal de Congresos, Madrid, Spain, Oct. 1-5 2018.

Huang et al., "Uncertainty-Aware Driver Trajectory Prediction at Urban Intersections," arXiv:1901.05105v2, Mar. 6, 2019.

Kocić et al., "Sensors and Sensor Fusion in Autonomous Vehicles," 26th Telecommunications Forum (TELFOR), Belgrade, Serbia, Nov. 20-21, 2018; pp. 420-425.

Zaghari, et al., "Improving the Learning of Self-driving Vehicles Based on Real Driving Behavior using Deep Neural Network Techniques", Preprints 2020.

* cited by examiner

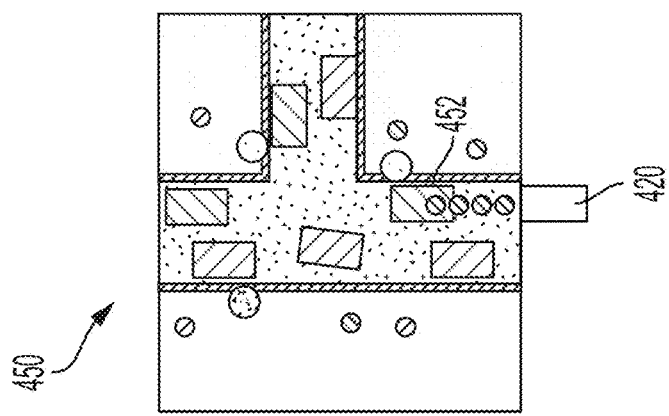
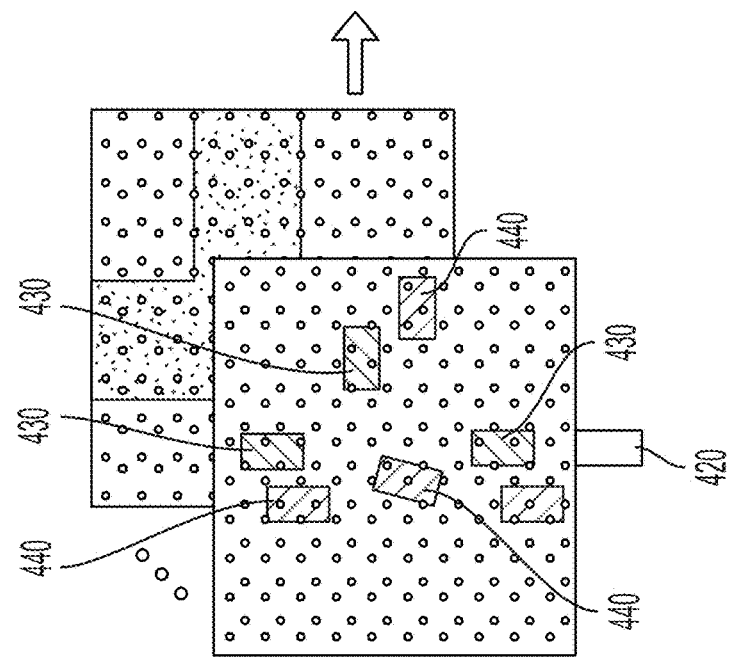
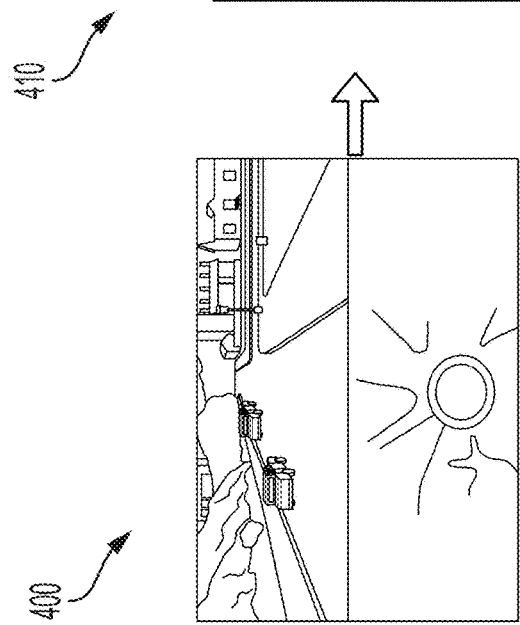
FIG. 4C
FIG. 4B
FIG. 4A

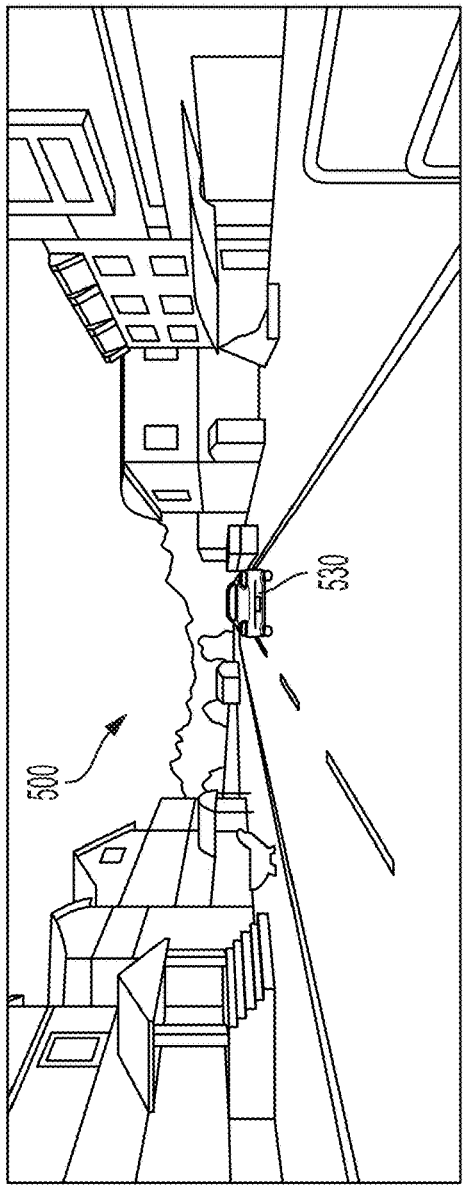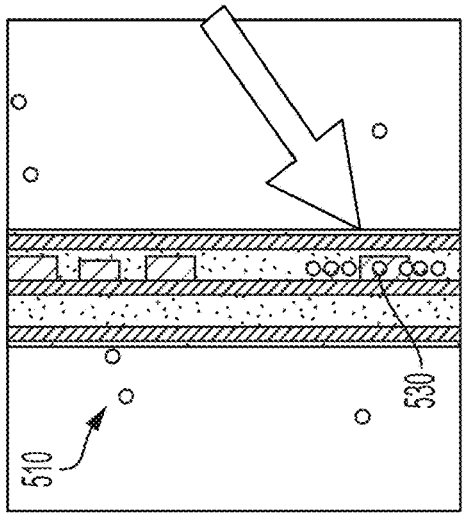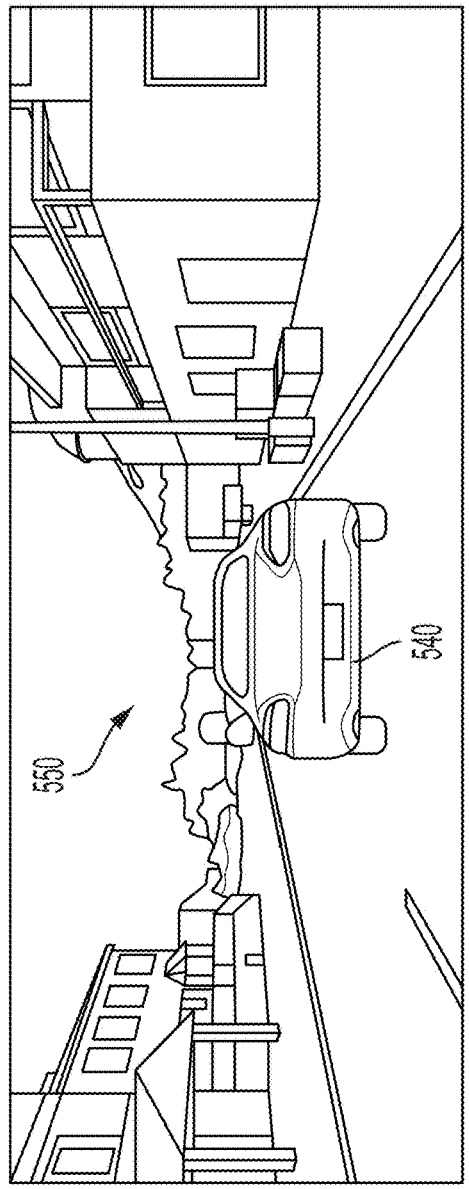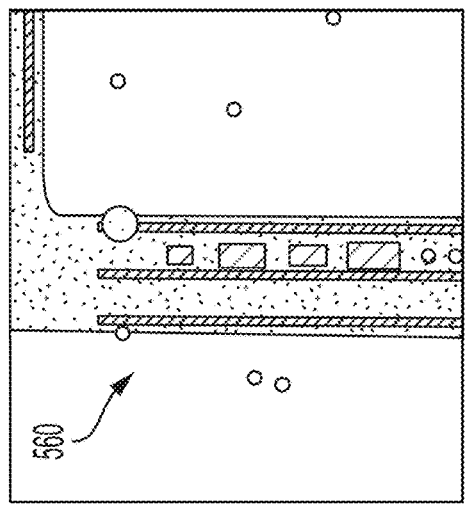

METHOD AND SYSTEM FOR BEHAVIORAL CLONING OF AUTONOMOUS DRIVING POLICIES FOR SAFE AUTONOMOUS AGENTS

BACKGROUND

Field

Certain aspects of the present disclosure generally relate to autonomous vehicle technology and, more particularly, to a method and system for behavioral cloning of autonomous driving polices to improve the safety of autonomous vehicles.

Background

Autonomous agents (e.g., vehicles, robots, etc.) rely on machine vision for sensing a surrounding environment by analyzing areas of interest in a scene from images of the surrounding environment. Although scientists have spent decades studying the human visual system, a solution for realizing equivalent machine vision remains elusive. Realizing equivalent machine vision is a goal for enabling truly autonomous agents. Machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents are quickly evolving and are a reality in this decade. Because autonomous agents interact with humans, many critical concerns arise. Safety is the most critical concern when building autonomous robots that operate in human environments. For autonomous driving in particular, safety is a formidable challenge due to high speeds, rich environments, and complex dynamic interactions with many traffic participants, including vulnerable road users. Safety substantially complicates the design of a vehicle control plan of an autonomous vehicle using machine learning.

Machine learning techniques for behavioral cloning of vehicle control planning that can safely leverage imperfect perception without being overly conservative are desired. Conventional modular behavioral cloning techniques for autonomous vehicles suffer from false-positive observations in their input space (henceforth referred to as "false-positives"), which may lead to catastrophic failures or overly conservative behavior.

SUMMARY

A method for behavior cloned vehicle trajectory planning is described. The method includes perceiving vehicles proximate an ego vehicle in a driving environment, including a scalar confidence value of each perceived vehicle. The method also includes generating a bird's-eye-view (BEV) grid showing the ego vehicle and each perceived vehicle based on each of the scalar confidence values. The method further includes ignoring at least one of the perceived vehicles when the scalar confidence value of the at least one of the perceived vehicles is less than a predetermined value. The method also includes selecting an ego vehicle trajectory based on a cloned expert vehicle behavior policy according to remaining perceived vehicles.

A non-transitory computer-readable medium having program code recorded thereon for behavior cloned vehicle trajectory planning is described. The program code being executed by a processor. The non-transitory computer-readable medium includes program code to perceive vehicles proximate an ego vehicle in a driving environment, including a scalar confidence value of each perceived vehicle. The non-transitory computer-readable medium also includes program code to generate a bird's-eye-view (BEV) grid showing the ego vehicle and each perceived vehicle based on each of the scalar confidence values. The non-transitory computer-readable medium further includes program code to ignore at least one of the perceived vehicles when the scalar confidence value of the at least one of the perceived vehicles is less than a predetermined value. The non-transitory computer-readable medium also includes program code to select an ego vehicle trajectory based on a cloned expert vehicle behavior policy according to remaining perceived vehicles.

A system for behavior cloned vehicle trajectory planning is described. The system includes a vehicle perception module configured to perceive vehicles proximate an ego vehicle in a driving environment, including a scalar confidence value of each perceived vehicle. The system also includes a semantic grid module configured to generate a bird's-eye-view (BEV) grid showing the ego vehicle and each perceived vehicle based on the scalar confidence value. The system further includes a behavior cloning model configured to ignore at least one of the perceived vehicles when the scalar confidence value of the at least one of the perceived vehicles is less than a predetermined value. The system also includes a vehicle trajectory selection module configured to select an ego vehicle trajectory based on a cloned expert vehicle behavior policy according to remaining perceived vehicles.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 4A-4C are diagrams illustrating a bird's-eye-view (BEV) overview of a highway environment to enable behavior cloned trajectory planning for an ego vehicle, according to aspects of the present disclosure.

FIGS. 5A-5D are diagrams illustrating ground-level images and corresponding BEV overviews of a roadway environment illustrating behavior cloned trajectory planning for an ego vehicle, according to aspects of the present disclosure.

DETAILED DESCRIPTION

Figure 1:
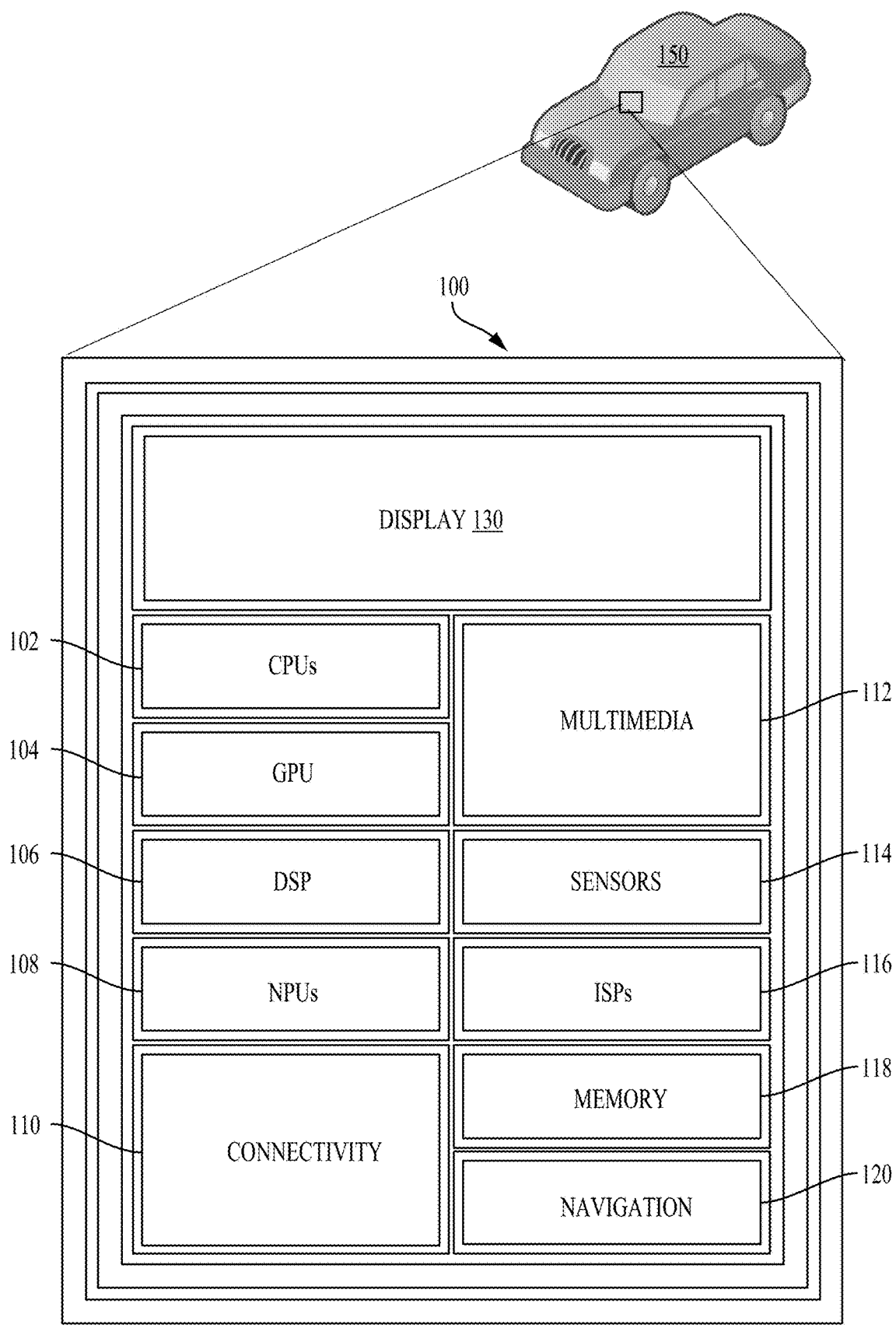
FIG. 1 illustrates an example implementation of designing a neural network using a system-on-a-chip (SOC) for a behavior cloned vehicle trajectory planning system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents are quickly evolving and are a reality in this decade. Because autonomous agents interact with humans, many critical concerns arise. Safety is the most critical concern when building autonomous robots that operate in human environments. For autonomous driving in particular, safety is a formidable challenge due to high speeds, rich environments, and complex dynamic interactions with many traffic participants, including vulnerable road users. Safety substantially complicates the design of a vehicle control plan of an autonomous vehicle using machine learning. In particular, safe autonomous driving involves robust detection of other traffic participants. Nevertheless, robust does not mean perfect, and safe systems typically minimize missed detections at the expense of a higher false-positive rate. This results in conservative and yet potentially dangerous behavior, such as avoiding imaginary obstacles.

Behavioral cloning is a deep machine learning technique in which a computer is taught to perform a task by learning to imitate a demonstration. End-to-end behavioral cloning is a popular approach for teaching an autonomous vehicle how to drive from demonstrations. Unfortunately, existing approaches suffer from generalization issues that involve potentially unsafe on-policy corrections. Though planning under uncertainty is a long-standing research topic, most approaches do not account for errors in perceptual inputs, focusing instead on uncertainty in the dynamics, future trajectories, model weights, demonstrations, or cost functions. A particularly important shortcoming of existing behavioral cloning approaches is that they do not handle false-positives due to perception errors (e.g., noisy sensor data) very well.

Sensorimotor imitation learning methods tackle the safety problem associated with autonomous driving by learning from end-to-end demonstrations. Although scalable, these approaches suffer from generalization issues, and thus lack statistical evidence of safe behavior. In contrast, modular approaches perform planning by using perceptual abstractions, which leads to improved generalization properties. Unfortunately, upstream perceptual errors within modular systems yield incorrect abstractions, which, when consumed by a downstream planner, can lead to critical failures. Furthermore, in the case of imitation learning, perceptual errors at training time can lead to learning difficulties, as expert demonstrations might be inconsistent with the world state perceived by the ego vehicle. Consequently, learning and deploying modular imitative policies in the real world involves modeling perceptual uncertainty during both learning and inference.

Aspects of the present disclosure are directed to a behavioral cloning approach for autonomous agents (e.g., autonomous vehicles) that can safely leverage imperfect perception without being overly conservative. In particular, the present disclosure provides a behavioral cloning approach that focuses specifically on how to deal with false-positives due to perception errors in the context of autonomous driving. In this context, the expert has access to ground truth information and the agent (e.g., the ego vehicle) might suffer from false-positive perceptions. The proposed approach to behavioral cloning overcomes some important limitations in the prior art. In particular, the proposed approach can safely overcome critical false-positives that would otherwise lead to catastrophic failures or overly conservative behavior in an autonomous vehicle.

FIG. 1 illustrates an example implementation of the aforementioned system and method for a behavior cloned vehicle trajectory planning system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, assess a navigation cost of a tactical driving decision to improve a vehicle trajectory planning system to select a vehicle trajectory plan, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include code to plan upcoming tactical driving decisions of the controlled ego vehicle to reach the target destination according to a mission plan. The instructions loaded into a processor (e.g., CPU 102) may also include code to perceive vehicles proximate an ego vehicle in a driving environment, including a scalar confidence value of each perceived vehicle. The instructions loaded into a processor (e.g., CPU 102) may also include code to generate a bird's-eye-view (BEV) grid showing the ego vehicle and each perceived vehicle based on each of the scalar confidence values. The instructions loaded into a processor (e.g., CPU 102) may also include code to ignore at least one of the perceived vehicles when the scalar confidence value of the at least one of the perceived vehicles is less than a predetermined value. The instructions loaded into a processor (e.g., CPU 102) may also include code to select an ego vehicle trajectory based on a cloned expert vehicle behavior policy according to remaining perceived vehicles.

Figure 2:
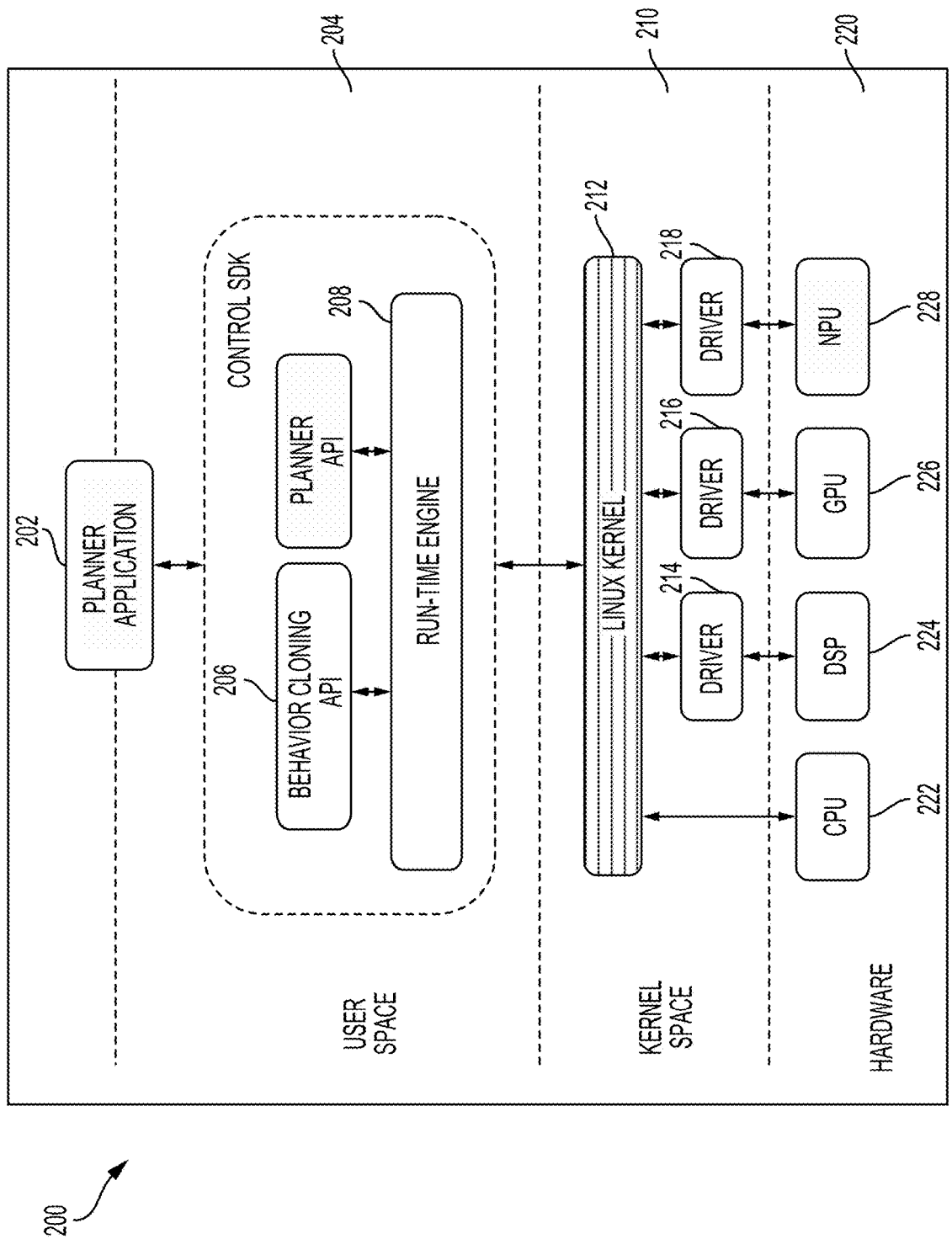
FIG. 2 is a block diagram illustrating a software architecture that may modularize artificial intelligence (AI) functions for a behavior cloned vehicle trajectory planning system of an autonomous agent, according to aspects of the present disclosure.

FIG. 2 is a block diagram illustrating a software architecture 200 that may modularize artificial intelligence (AI) functions for planning a vehicle trajectory of an autonomous agent by modeling autonomous driving policies using behavior cloning, according to aspects of the present disclosure. Using the architecture, a planner application 202 may be designed such that it may cause various processing blocks of an SOC 220 (for example a CPU 222, a DSP 224, a GPU 226, and/or an NPU 228) to perform supporting computations during run-time operation of the planner application 202. While FIG. 2 describes the software architecture 200 for behavior cloned planning of a trajectory of an autonomous agent, it should be recognized that behavior cloned vehicle trajectory planning functionality is not limited to autonomous agents. According to aspects of the present disclosure, behavior cloned vehicle trajectory planning functionality is applicable to any vehicle type, provided the vehicle is equipped with appropriate autonomous functions.

The planner application 202 may be configured to call functions defined in a user space 204 that may, for example, provide for behavior cloned vehicle trajectory planning services. The planner application 202 may make a request to compile program code associated with a library defined in a behavior cloning application programming interface (API) 206 to plan a vehicle trajectory. Planning of the vehicle trajectory may ultimately rely on the output of a convolutional neural network configured to plan a trajectory of an autonomous agent based on behavioral cloning of autonomous driving policies for the autonomous agent.

A run-time engine 208, which may be compiled code of a run-time framework, may be further accessible to the planner application 202. The planner application 202 may cause the run-time engine 208, for example, to take actions for planning the controlling of an autonomous agent. When an ego vehicle plans a trajectory to merge onto a traffic lane based on a behavior cloned autonomous driving policy, the run-time engine 208 may in turn send a signal to an operating system 210, such as a Linux Kernel 212, running on the SOC 220. FIG. 2 illustrates the Linux Kernel 212 as software architecture for implementing behavior cloned trajectory planning of an autonomous agent based on autonomous driving policies. It should be recognized, however, that aspects of the present disclosure are not limited to this exemplary software architecture. For example, other kernels may be used to provide the software architecture to support behavior clone vehicle plan selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
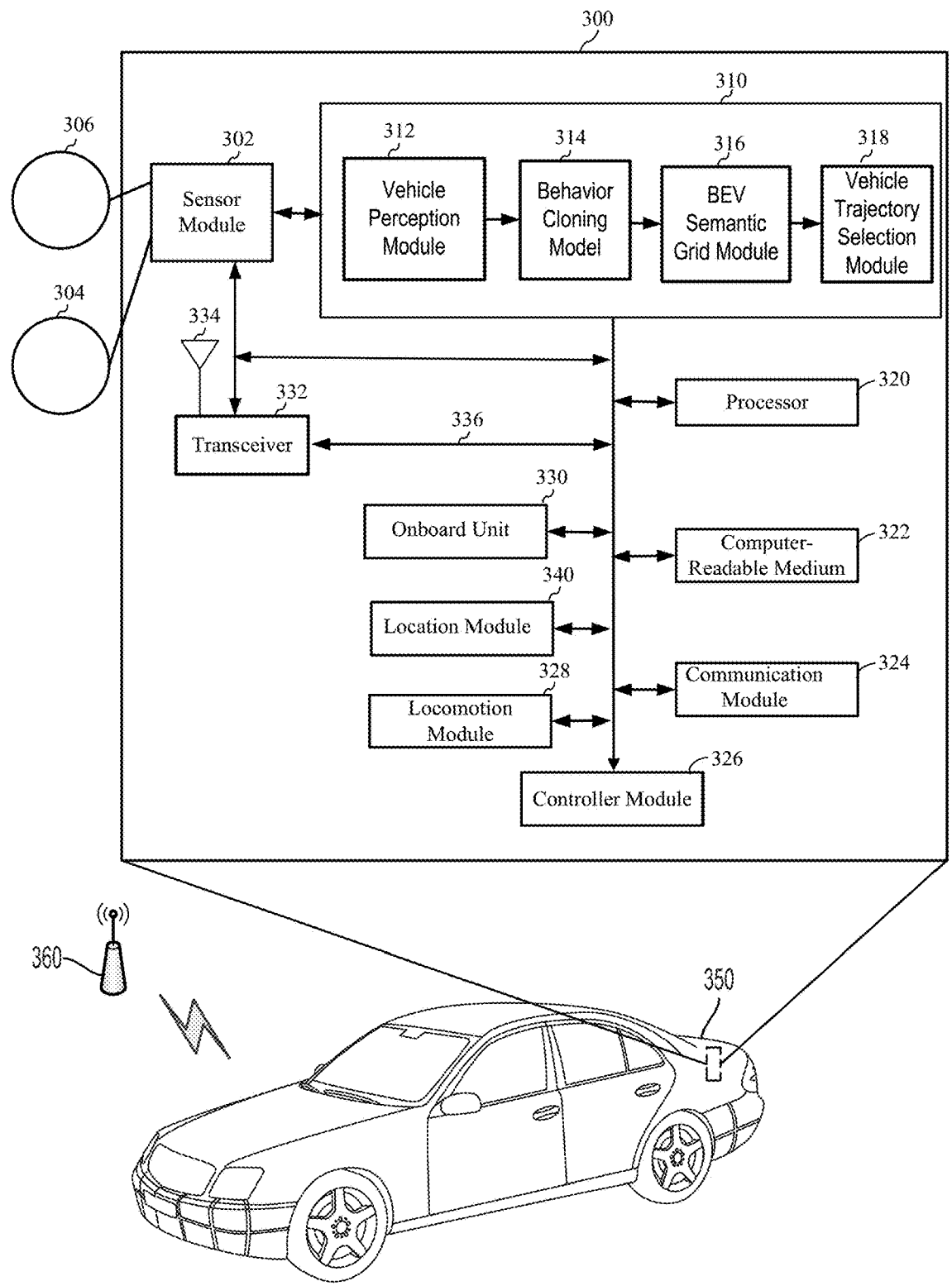
FIG. 3 is a diagram illustrating an example of a hardware implementation for a behavior cloned vehicle control planning system, according to aspects of the present disclosure.

FIG. 3 is a diagram illustrating an example of a hardware implementation for a behavior cloned vehicle trajectory planning system 300, according to aspects of the present disclosure. The behavior cloned vehicle trajectory planning system 300 may be configured for improved planning of tactical driving decisions using behavioral cloning of autonomous driving policies. For example, behavioral cloning of autonomous driving policies is used to improve the trajectory planning efficiency of an ego vehicle in performing, for example, tactical driving maneuvers (e.g., a right/left turn). The behavior cloned vehicle trajectory planning system 300 may be a component of a vehicle, a robotic device, or other non-autonomous device (e.g., non-autonomous vehicles, ride-share cars, etc.). For example, as shown in FIG. 3, the behavior cloned vehicle trajectory planning system 300 is a component of a car 350.

Aspects of the present disclosure are not limited to the behavior cloned vehicle trajectory planning system 300 being a component of the car 350. Other devices, such as a bus, motorcycle, or other like non-autonomous vehicle, are also contemplated for implementing the behavior cloned vehicle trajectory planning system 300. In this example, the car 350 may be autonomous or semi-autonomous; however, other configurations for the car 350 are contemplated, such as an advanced driver assistance system (ADAS).

The behavior cloned vehicle trajectory planning system 300 may be implemented with an interconnected architecture, represented generally by an interconnect 336. The interconnect 336 may include any number of point-to-point interconnects, buses, and/or bridges, depending on the specific application of the behavior cloned vehicle trajectory planning system 300 and the overall design constraints. The interconnect 336 links together various circuits, including one or more processors and/or hardware modules, represented by a sensor module 302, a vehicle trajectory planner 310, a processor 320, a computer-readable medium 322, a communication module 324, a controller module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The behavior cloned vehicle trajectory planning system 300 includes a transceiver 332 coupled to the sensor module 302, the vehicle trajectory planner 310, the processor 320, the computer-readable medium 322, the communication module 324, the controller module 326, the locomotion module 328, the location module 340, and the onboard unit 330. The transceiver 332 is also coupled to an antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle state information for the vehicle trajectory planner 310 to/from connected vehicles within the vicinity of the car 350.

The behavior cloned vehicle trajectory planning system 300 includes the processor 320 coupled to the computer-readable medium 322. The processor 320 performs processing, including the execution of software stored on the computer-readable medium 322 to provide functionality according to the present disclosure. The software, when executed by the processor 320, causes the behavior cloned vehicle trajectory planning system 300 to perform the various functions described for vehicle trajectory (e.g., a planned trajectory for vehicle merging prior to a critical intersection) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle trajectory planner 310, the communication module 324, the controller module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)—compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, Wi-Fi, long term evolution (LTE), 4G, 3G, etc. The communication module 324 may also communicate with other components of the car 350 that are not modules of the behavior cloned vehicle trajectory planning system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The behavior cloned vehicle trajectory planning system 300 also includes the controller module 326, controlling the locomotion of the car 350 via the locomotion module 328 for autonomous operation of the car 350 to enable travel to a goal destination. In one configuration, the controller module 326 may override a user input when the user input is expected (e.g., predicted) to cause a collision, according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), drivers can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle trajectory planner 310 may be in communication with the sensor module 302, the processor 320, the computer-readable medium 322, the communication module 324, the controller module 326, the locomotion module 328, the location module 340, the onboard unit 330, and the transceiver 332. In one configuration, the vehicle trajectory planner 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle trajectory planner 310 may receive sensor data directly from the first sensor 306 and the second sensor 304 to determine, for example, input traffic data images.

As shown in FIG. 3, the vehicle trajectory planner 310 includes a vehicle perception module 312, a behavior cloning model 314, a BEV semantic grid module 316, and a vehicle trajectory selection module 318. The vehicle perception module 312, the behavior cloning model 314, the BEV semantic grid module 316, and the vehicle trajectory selection module 318 may be components of the same or different artificial neural network, such as a deep convolutional neural network (CNN). The vehicle trajectory planner 310 is not limited to a CNN. The vehicle trajectory planner 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

In the context of behavioral cloning, perceptual errors at training time can lead to learning difficulties or incorrect policies, as expert demonstrations might be inconsistent with a perceived world state. Aspects of the present disclosure are directed to a behavioral cloning approach (e.g., behavior cloning model 314) that can safely leverage imperfect perception from the vehicle perception module 312 without being overly conservative. One aspect of the present disclosure provides a novel representation of perceptual uncertainty for learning to plan operation of an ego vehicle.

Another aspect of the present disclosure proposes a new probabilistic BEV semantic grid (e.g., the BEV semantic grid module 316) to encode the noisy output of object perception systems, such as the vehicle perception module 312. In addition, expert demonstrations are leveraged by the behavior cloning model 314 to learn an imitative driving policy using this probabilistic representation. In operation, the BEV semantic grid module 316 in combination with the vehicle trajectory selection module 318 safely overcome critical false-positives that would otherwise lead to catastrophic failures or conservative trajectory planning behavior of the car 350 using the vehicle trajectory selection module 318.

Although planning under uncertainty is a long-standing research topic, most approaches do not account for errors in perceptual inputs. Modern perception systems rely on deep neural networks in which uncertainty modeling remains an issue. In particular, a manner for properly modeling and using those uncertainties in downstream components like a planner is desired. One aspect of the present disclosure is directed to a behavioral cloning process that uses a non-parametric representation of an uncertain world state as predicted by typical perception systems. This aspect of the present disclosure is directed to a novel representation that combines predicted visual abstractions and scalar confidence values by convolving them in a discrete top-down BEV grid, for example, as shown in FIG. 4C.

FIGS. 4A-4C are diagrams illustrating a BEV overview of a roadway environment to enable behavior cloned trajectory planning for an ego vehicle, according to aspects of the present disclosure. FIG. 4A shows a ground-level image 400 of a two-lane road showing on-coming traffic captured by an ego vehicle, as well as a top-down viewed point cloud representation of the surroundings of the ego vehicle. FIG. 4B shows an intermediate BEV 410 of the ground-level image 400, including an ego vehicle 420. For example, a traffic state perceived by the ego vehicle is inconsistent with a current traffic state (e.g., world state), which is referred to as perceptual uncertainty. In particular, the ego vehicle 420 perceives phantom vehicles 430 and actual vehicles 440. In this example, the ego vehicle 420 is configured according to a planning model (e.g., the behavior cloning model 314) as learned by imitation from expert demonstrations. Due to the phantom vehicles detected by the vehicle perception module 312, the expert demonstration is inconsistent with a world state (e.g., current traffic state) perceived by the ego vehicle 420.

FIG. 4C is a diagram illustrating a BEV overview 450 of a roadway environment to enable behavior cloned trajectory planning for an ego vehicle, according to aspects of the present disclosure. In one configuration, a novel representation is incorporated into a tensor, which is provided as input to a deep convolutional policy network (e.g., a planning model of the behavior cloning model 314) of the ego vehicle. This planning model is learned by imitation from expert demonstrations, which might be inconsistent with the world state perceived by the ego vehicle 420. Nevertheless, as a tensor input representation captures perceptual uncertainty across a full scene, these inconsistencies can in fact exhibit probabilistic patterns.

As shown in FIG. 4C, the policy network of the ego vehicle 420 trusts the perception of the actual vehicles 440, while not trusting the perception of the phantom vehicles 430. According to aspects of the present disclosure, a policy network of the ego vehicle 420 learns when to trust perception or not, thus recovering imitative policies that safely avoid excessively conservative behavior in the presence of perception errors. Otherwise, the ego vehicle 420 engages in unnecessary trajectory planning and control actions to avoid a first phantom vehicle 452.

FIGS. 5A-5B are diagrams illustrating ground-level images and corresponding BEV overviews of a roadway environment during a false-positive vehicle object detection, according to aspects of the present disclosure. FIG. 5A shows a ground-level image 500 of a two-lane road showing a current traffic state captured by an ego vehicle. FIG. 5B shows a BEV grid 510 of the ground-level image 500.

Unfortunately, perceptual uncertainty causes an ego vehicle to perceive a phantom vehicle 530. As described, detection of the phantom vehicle 530 is the result of a false-positive vehicle object detection by a perception system (e.g., the vehicle perception module 312) of the ego vehicle.

FIGS. 5C-5D are diagrams illustrating ground-level images and corresponding BEV overviews of a roadway environment illustrating behavior cloned trajectory planning for an ego vehicle, according to aspects of the present disclosure. FIG. 5C shows a ground-level image 550 of a two-lane road showing a current traffic state captured by an ego vehicle. FIG. 5D shows a BEV grid 560 of the ground-level image 550. This example overcomes the perceptual uncertainty that caused the ego vehicle to perceive the phantom vehicle 530 in FIGS. 5A and 5B. That is, detection of the phantom vehicle 530 is recognized as a false-positive vehicle object detection by a perception system of the ego vehicle. As a result, the ego vehicle drives through the phantom vehicle 530, but is able to recognize an actual vehicle 540 and stop from a true position, as follows.

I. Imitation Under Perceptual Uncertainty

In this section, a behavioral cloning process is presented for effectively leveraging mediated perception even in the presence of false-positives, according to aspects of the present disclosure.

A. Imitation Learning with Mediated Perception

One aspect of the present disclosure is directed to learning the parameters θ of a policy $7r$ that can predict the actions a of an autonomous agent (e.g., robot) from observations o, i.e., π(o; θ)=a. For example, robot actions are future waypoints a={$w_1$, . . . $w_K$} passed to a downstream controller. In contrast to end-to-end sensorimotor approaches, observations are not raw sensor signals, but instead are the outputs of a perception system (e.g., object tracks, localization, and mapping information).

In one configuration, policy parameters θ are estimated by behavioral cloning. For example, behavioral cloning to estimate policy parameters θ is performed by supervised learning from a set of optimal demonstrations {$\tau_1$, . . . $\tau_n$} generated by an expert policy $\pi_e$. Although the expert (a.k.a. oracle) has access to a true world state s (e.g., ground truth position of other agents), this high-level information cannot be measured directly by the sensors of the autonomous agent. Therefore, each demonstration $\tau_k$ is assumed to consist of observation-action pairs $\tau_k$=($o_k$, $a_k$), where observations are recorded predictions of the perception system of the autonomous agent. It is assumed, however, that actions a can be accurately measured (e.g., using global navigation satellite systems (GNSS) or recording controller area network (CAN) bus signals for cars). This setup is different than standard behavioral cloning, as this configuration approximates an expert while operating over a different input space:

$$\pi(o;\theta) \sim a = \pi_e(s) \tag{1}$$

A key challenge lies in potential inconsistencies between observations o and the true state s, for instance in the presence of false-positives in o. This is incompatible with supervised learning, as the same observations may yield potentially different target actions (e.g., stopping or passing through an obstacle).

B. Input Uncertainty Representation Via Soft BEV

To overcome inconsistencies between observations and actions, uncertainty estimates provided by modern perception systems are leveraged. This aspect of the present disclosure models observations o=(ŝ, c) as pairs of estimated perceptual states ŝ and black-box confidence values c in [0; 1] for each state variable. These confidence estimates are assumed to negatively correlate with error rates of the respective perception sub-systems, although they might be inaccurate. This is a reasonable assumption in practice, as there are multiple methods of achieving this assumption.

This configuration does not make explicit assumptions about the distribution of § with respect to the true state s. Instead, the perception system is tuned for high recall (e.g., that all critical state variables are (noisily) captured in the estimated state). This assumption comes at the potential expense of false-positives, but corresponds to the practical setup where safety specifications are generally designed to avoid partial observability issues, as false-negatives are practically impossible from which to recover.

This aspect of the present disclosure represents the observations o in a BEV grid. For example, the BEV grid is configured as an N×M×D-dimensional tensor ϕ), where each k dimension represents a category of an estimated state (e.g., an object or feature type), together with the respective estimated confidences. Each slice ($P_k$ is a matrix $\phi_k \in [0; 1]^{N \times M}$, where each element corresponds to the presence of an estimated object or feature of type k at that location, weighted by its estimated confidence. As described, the resulting input $\phi$ representation is referred to as Soft BEV.

C. Behavioral Cloning with Soft BEV

Figure 6:
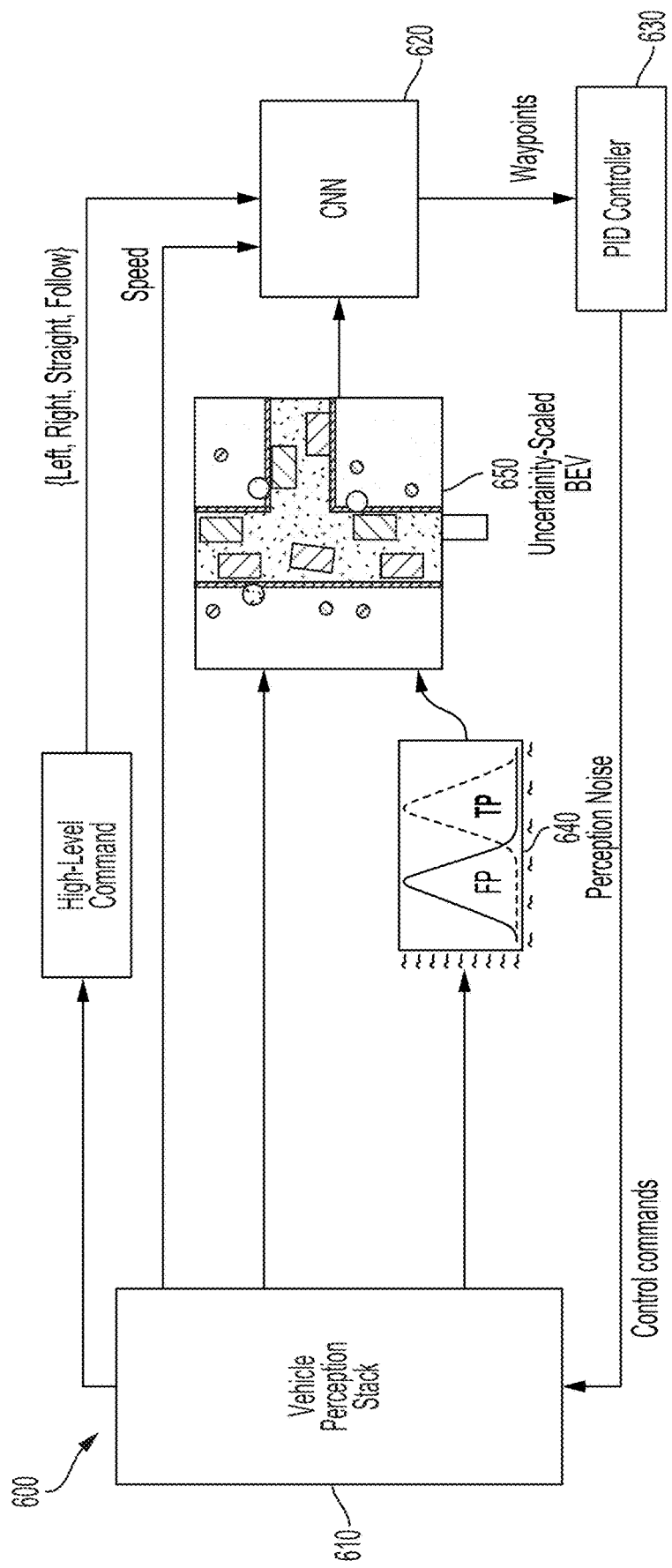
FIG. 6 is a diagram illustrating an overview of a behavior cloned vehicle trajectory planning system, according to aspects of the present disclosure.

FIG. 6 is a block diagram illustrating a behavioral cloning system 600, using a soft BEV 650, in accordance with aspects of the present disclosure. In this configuration, a vehicle perception stack 610 of a driving agent is modeled via a deep convolutional policy network taking as input the aforementioned Soft BEV representation $\phi$. In this example, a convolutional neural network (CNN) 620 outputs waypoints along the future trajectory, which are then used by a proportional-integral-derivative (PID) controller 630 to compute the control signals for the steering and throttle of a vehicle.

One configuration of the vehicle perception stack 610 is composed of a ResNet-18 base network acting as an encoder, followed by three de-convolutional layers of the CNN 620, which also have as an input the current speed signal and the high-level commands. For each of the potential high-level commands ("go left," "go right," "go straight," "follow the road"), the CNN 620 predicts multiple output heat-maps which are then converted into way-points by spatial soft-argmax layers. Based on the high-level command, the respective head of the CNN 620 is used to predict the way-points.

To operate correctly under uncertainty, this aspect of the present disclosure learns a policy that fulfills the standard behavioral cloning target, while additionally remaining invariant to the perception noise 640 in the input features. As uncertainty of the perception noise 640 is directly encoded in the input representation of the BEV 650, the optimal actions (as done by the expert) can still be optimal under the perception noise 640, as long as the behavioral patterns are not dominated by a wrong bias in uncertainty estimates. This is a reasonable assumption in practice, as consistent patterns of errors can be characterized on a validation set and addressed specifically. Therefore, the problem can still be treated as a supervised policy learning, and the following optimization problem is solved:

$$\theta^* = \operatorname*{argmin}_{\theta} \sum_i l(\pi(\phi^i; \theta), \pi_e(s_i)) \qquad (2)$$

where l is a loss function, in this case the $L_1$-distance.

Figure 7:
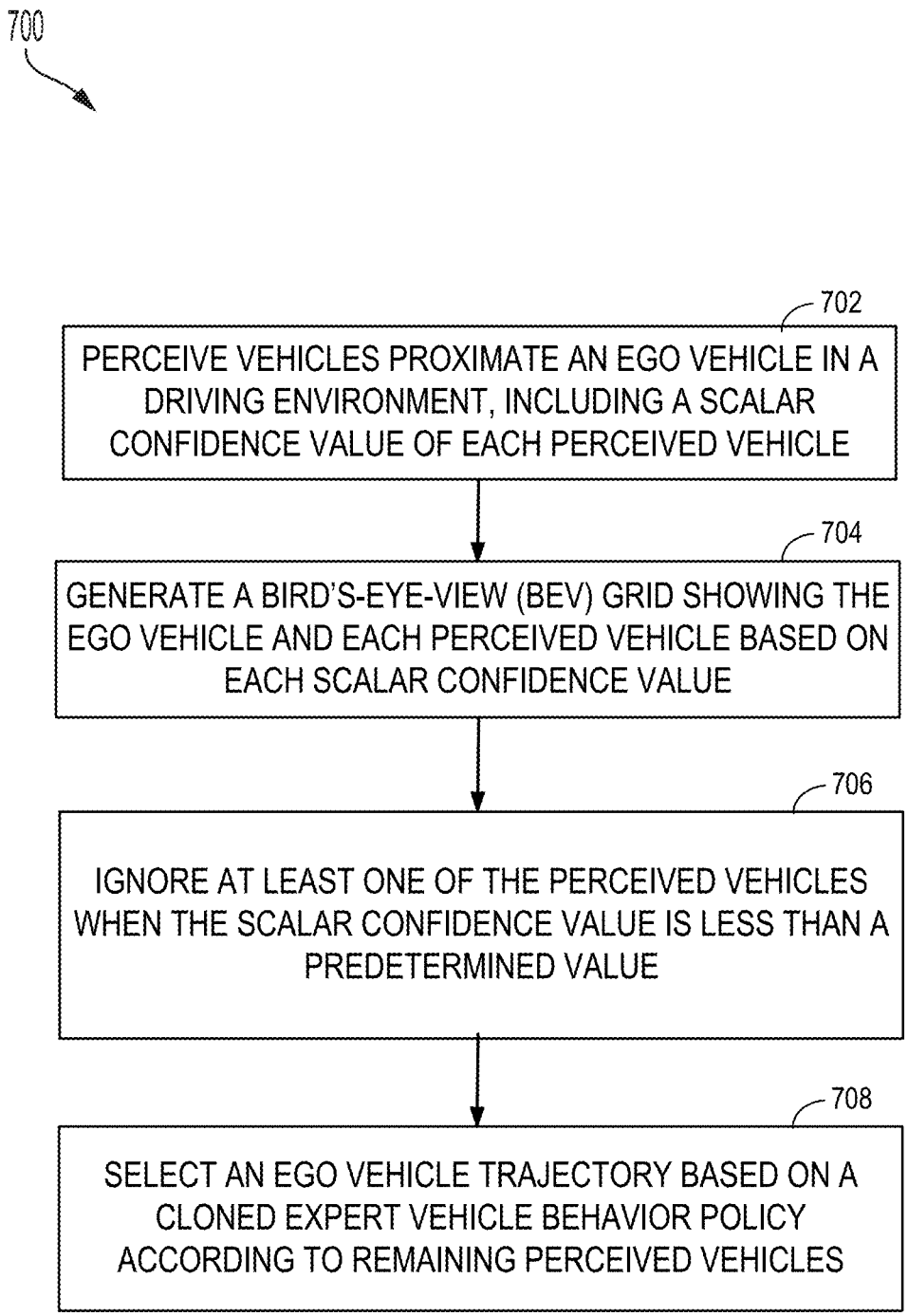
FIG. 7 is a flowchart illustrating a method of behavior cloned vehicle trajectory planning, according to aspects of the present disclosure.

FIG. 7 is a flowchart illustrating a method for behavior cloned vehicle trajectory planning, according to aspects of the present disclosure. A method 700 begins at block 702, in which vehicles proximate an ego vehicle are perceived in a driving environment, including a scalar confidence value of each perceived vehicle. For example, as shown in FIG. 5A, perceptual uncertainty causes an ego vehicle to perceive a phantom vehicle 530. As described, detection of the phantom vehicle 530 is the result of a false-positive vehicle object detection by a perception system (e.g., the vehicle perception module 312) of the ego vehicle.

At block 704, a BEV grid is generated, showing the ego vehicle and each perceived vehicle based on each scalar confidence value. For example, FIG. 5D shows a BEV grid 560 of the ground-level image 550. At block 706, at least one of the perceived vehicles is optionally ignored based on the certainty value (e.g., when a scalar confidence value is less than a predetermined value). For example, FIGS. 5C and 5D show overcoming of the perceptual uncertainty that caused the ego vehicle to perceive the phantom vehicle 530 in FIGS. 5A and 5B. That is, detection of the phantom vehicle 530 is recognized as a false-positive vehicle object detection by a perception system of the ego vehicle. Nevertheless, if confidence values are high (e.g., 1.0), none of the perceived vehicles are ignored. At block 708, an ego vehicle trajectory is selected based on a cloned expert vehicle behavior policy according to remaining perceived vehicles. As shown in FIG. 5D, the ego vehicle drives through the phantom vehicle 530, but is able to recognize an actual vehicle 540 and stops in time to avoid the actual vehicle 540.

The method 700 may include detecting vehicle objects and non-vehicle objects proximate the ego vehicle, including 2D locations of the vehicle objects and the non-vehicle objects. The method 700 may further include determining the scalar confidence value associated with each of the vehicle objects and the non-vehicle objects. The method 700 may also include feeding the BEV grid to a deep convolutional policy network. The method 700 may further include outputting, by the deep convolutional policy network, way-points along a future trajectory. The method 700 may also include computing, by a proportional-integral-derivative (PID) controller (or other like reference tracking controller), control signals for steering and throttle of the ego vehicle. The method 700 may further include computing an N×M× D-dimensional tensor $\phi$, where each k dimension represents a category of an estimated state together with a respective estimated confidence value, for example, as shown in FIG. 6.

In some aspects, the method shown in FIG. 7 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102), and/or other components included therein of the autonomous vehicle 150 or the behavior cloned vehicle trajectory planning system 300.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects, computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for behavior cloned vehicle trajectory planning, the method comprising:
   perceiving vehicles proximate an ego vehicle in a driving environment, including a scalar confidence value of each perceived vehicle;
   generating a bird's-eye-view (BEV) grid showing the ego vehicle and each perceived vehicle based on each of the scalar confidence values by computing a 3D tensor $\phi$, where each dimension of the 3D tensor $\phi$ represents a category of an estimated state together with a respective estimated confidence value;
   ignoring at least one of the perceived vehicles when the scalar confidence value of the at least one of the perceived vehicles is less than a predetermined value; and
   selecting an ego vehicle trajectory based on a cloned expert vehicle behavior policy according to remaining perceived vehicles.

2. The method of claim 1, in which perceiving comprises:
   detecting vehicle objects and non-vehicle objects proximate the ego vehicle, including 2D locations of the vehicle objects and the non-vehicle objects; and
   determining the scalar confidence value associated with each of the vehicle objects and the non-vehicle objects.

3. The method of claim 1, in which the 3D tensor $\phi$ comprises a plurality of slices $\phi_k$, in which each slice $\phi_k$ is a matrix $\phi_k \in [0; 1]^{N \times M}$, where each element corresponds to a presence of an estimated object or feature of type k at a location, and weighted by its estimated confidence, and N and M integers greater than zero.

4. The method of claim 1, further comprising incorporating perception noise into the BEV grid.

5. The method of claim 1, in which selecting the ego vehicle trajectory comprises:
   feeding the BEV grid to a deep convolutional policy network;
   outputting, by the deep convolutional policy network, way-points along a future trajectory; and
   computing, by a reference tracking controller, control signals for steering and throttle of the ego vehicle.

6. The method of claim 1, in which the ego vehicle is in a lane of a road and a phantom vehicle is detected at an upcoming intersection.

7. The method of claim 1, further comprising training the ego vehicle using behavior cloning with false-positives.

8. A non-transitory computer-readable medium having program code recorded thereon for behavior cloned vehicle trajectory planning, the program code being executed by a processor and comprising:
   program code to perceive vehicles proximate an ego vehicle in a driving environment, including a scalar confidence value of each perceived vehicle;
   program code to generate a bird's-eye-view (BEV) grid showing the ego vehicle and each perceived vehicle based on each of the scalar confidence values by program code to compute a 3D tensor $\phi$, where each dimension of the 3D tensor $\phi$ represents a category of an estimated state together with a respective estimated confidence value;
   program code to ignore at least one of the perceived vehicles when the scalar confidence value of the at least one of the perceived vehicles is less than a predetermined value; and
   program code to select an ego vehicle trajectory based on a cloned expert vehicle behavior policy according to remaining perceived vehicles.

9. The non-transitory computer-readable medium of claim 8, in which the program code to perceive comprises:
   program code to detect vehicle objects and non-vehicle objects proximate the ego vehicle, including 2D locations of the vehicle objects and the non-vehicle objects; and program code to determine the scalar confidence value associated with each of the vehicle objects and the non-vehicle objects.

10. The non-transitory computer-readable medium of claim 9, in which the 3D tensor $\phi$ comprises a plurality of slices $\phi_k$, in which each slice $\phi_k$ is a matrix $\phi_k \in [0; 1]^{N \times M}$, where each element corresponds to a presence of an estimated object or feature of type k at a location, and weighted by its estimated confidence, and N and M integers greater than zero.

11. The non-transitory computer-readable medium of claim 8, further comprising program code to incorporate perception noise into the BEV grid.

12. The non-transitory computer-readable medium of claim 8, in which the program code to select the ego vehicle trajectory comprises:
program code to feed the BEV grid to a deep convolutional policy network;
program code to output, by the deep convolutional policy network, way-points along a future trajectory; and
program code to compute control signals for steering and throttle of the ego vehicle.

13. The non-transitory computer-readable medium of claim 8, in which the ego vehicle is in a lane of a road and a phantom vehicle is detected at an upcoming intersection.

14. The non-transitory computer-readable medium of claim 8, further comprising program code to train the ego vehicle using behavior cloning with false-positives.

15. A system for behavior cloned vehicle trajectory planning, the system comprising:
a vehicle perception module configured to perceive vehicles proximate an ego vehicle in a driving environment, including a scalar confidence value of each perceived vehicle;
a semantic grid module configured to generate a bird's-eye-view (BEV) grid showing the ego vehicle and each perceived vehicle based on the scalar confidence values by computing a 3D tensor $\phi$, where each dimension of the 3D tensor $\phi$ represents a category of an estimated state together with a respective estimated confidence value;
a behavior cloning model configured to ignore at least one of the perceived vehicles when the scalar confidence value of the at least one of the perceived vehicles is less than a predetermined value; and
a vehicle trajectory selection module configured to select an ego vehicle trajectory based on a cloned expert vehicle behavior policy according to remaining perceived vehicles.

16. The system of claim 15, in which the vehicle perception module is further configured to detect vehicle objects and non-vehicle objects proximate the ego vehicle, including 2D locations of the vehicle objects and the non-vehicle objects, and to determine the scalar confidence value associated with each of the vehicle objects and the non-vehicle objects.

17. The system of claim 15, in which the vehicle trajectory selection module is further configured to feed the BEV grid to a deep convolutional policy network, to output, by the deep convolutional policy network, way-points along a future trajectory, and to compute control signals for steering and throttle of the ego vehicle.

18. The system of claim 15, in which the behavior cloning model is further configured to train the ego vehicle using behavior cloning with false-positives.

* * * * *